2,900,225
PROCESS FOR THE PRODUCTION OF SiH₂Cl₂

Hermann Clasen, Frankfurt am Main, Germany, assignor, by mesne assignments, to Siemens & Halske Aktiengesellschaft, Munich, Germany No Drawing. Application June 25, 1956
Serial No. 593,385

9 Claims. (Cl. 23—14)

The present invention relates to a process for the exchange of SiCl bonds and SiH bonds in silicon compounds, and especially to the hydrogenation of the SiCl bonds of such silicon atoms of silicon compounds, which contain either no or only one SiH bond.

It is known that tetrachlorosilane $SiCl_4$ is easily converted to monosilane $SiH_4$ with $LiAlH_4$, but this method is rather costly.

Attempts have also been made to develop less costly hydrogenation procedures in which chlorosilanes, especially dichlorosilane $SiH_2Cl_2$, could be obtained from $SiCl_4$. It is, for example, known to hydrogenate $SiC_4$ with hydrogen at elevated temperatures in the presence of acid acceptors, such as Zn, Al and Si. However, such process only led to the production of small quantities of $SiHCl_3$ in addition to traces of $SiH_2Cl_2$ and $Si_2Cl_6$. The hydrogenation of $SiCl_4$ up only to $SiHCl_3$ with only poor yields by this process is, however, not interesting, as $SiHCl_3$ can be produced in moderate yields and cheaper by reacting silicon in the presence of copper with a mixture of hydrogen chloride gas and hydrogen at 250° C. The latter process also produces $SiCl_4$ and very little $SiH_2Cl_2$.

Recently it was also found that $SiCl_4$ can be hydrogenated in the gas phase with formaldehyde in the presence of gamma $Al_2O_3$ at 400° C. As the process is carried out at low pressure, the space-time yield is poor. Furthermore, the process is dangerous because of the possibility of spontaneous polymerization of the formaldehyde. Also, as the process is carried out at temperatures above the decomposition temperature of formaldehyde, a portion thereof is lost through side reactions. Higher yields of $SiH_2Cl_2$ are only attainable with poor conversion of the $SiCl_4$. In addition, the catalyst employed is inactivated after only short periods of time.

Actually, previously, there has been no technically ulitizable process for hydrogenating $SiCl_4$ or $SiHCl_3$ to $SiH_2Cl_2$. This product, however, is especially interesting as an intermediate in the production of polydialkylsiloxans and therefore an inexpensive process for hydrogenating $SiCl_4$, or at least $SiHCl_3$, to $SiH_2Cl_2$ is especially valuable. Furthermore, it was desirable to be able to hydrogenate the SiCl bonds of other compounds, especially mono and di silanes carrying organic substituents, by a method less expensive than with lithium alanate ($LiAlH_4$). The replacement of a SiCl bond by a SiH bond would, for example, make it possible to obtain silanols and siloxanes by oxidative means instead of hydrolytic means. Also, olefins can be added to SiH bonds with the production of alkyl silicon compounds.

According to the invention, it was unexpectedly found that SiCl bonds of silicon atoms which carry at most one SiH bond could be exchanged with SiH bonds of such silicon atoms carrying at least two SiH bonds at elevated temperatures of about 100 to 400° C., preferably 200 to 300° C., and especially in the presence of Friedel-Crafts catalysts. The exchange according to the invention can be effected intramolecularly, as well as intermolecularly.

The use of Friedel-Crafts catalysts is important for the rapid progress of the reaction according to the invention. Furthermore, it is advantageous to employ pressure vessels which are filled to a high degree. The process, however, can be carried out without use of high pressures and can be carried out continuously.

The reaction according to the invention is an exchange reaction between SiCl and SiH bonds corresponding to the equilibrium. It, for example, in the case of the hydrogenation of $SiCl_4$ with $SiH_4$ to $SiH_2Cl_2$ proceeds according to the following equation:

(1) $$SiCl_4 + SiH_4 \rightarrow 2\ SiH_2Cl_2$$

$SiHCl_3$ and $SiH_3Cl$ are formed at the same time. The equilibrium however lies far to the side of the formation of dischlorosilane so that it is possible to convert $SiCl_4$ with $SiH_4$ practically completely to chlorohydrogensilanes in one step.

$SiHCl_3$ can be employed as a starting material in place of $SiCl_4$ when, for example, $SiH_2Cl_2$ is to be produced. The quantity of $SiH_4$ required in such case is less and the reaction proceeds according to the following equation:

(2) $$2\ SiHCl_3 + SiH_4 \rightarrow 3\ SiH_2Cl_2$$

An especially noteworthy characteristic of the process according to the invention is that the entire silicon in the chlorosilane is not derived from the relatively expensive monosilane but that, in the case of the reaction according to Equation 1, only one half of the silane is derived from monosilane and, in the case of the reaction according to Equation 2, only one third is derived from the monosilane and the remainder is derived from the less expensive $SiCl_4$ or $SiHCl_3$.

It is rather surprising that the reaction according to the invention proceeds so smoothly. It was not to be expected that the very stable $SiCl_4$ and the very labile $SiH_4$ would react so easily with the exchange of the Cl— and H— bonds.

It is also surprising that $SiHCl_3$ will react with $SiH_4$, as silicon chloroform appeared to have a greater stability than $SiH_2Cl_2$ and $SiH_3Cl$ as the two last silanes hardly were ever produced in any reaction which was carried out at elevated temperatures. It was rather to be expected that the temperature required for the exchange according to the invention would be so high that $SiH_4$, $SiH_3Cl$ and $SiH_2Cl_2$ would already be rapidly and completely decomposed.

It was therefore completely unexpected that the conversion according to the invention of, for example, 75 grams of $SiCl_4$ with about 16 grams of $SiH_4$ in the presence of 5 grams of $AlCl_3$ at 300° C. in an autoclave of 200 cc. capacity was substantially completed in less than 4 hours. The chlorosilane reaction product was of the following composition:

17% $SiH_3Cl$
30% $SiH_2Cl_2$
40% $SiHCl_3$
13% $SiCl_4$

A small quantity of $SiH_4$ had not been converted and only 1 liter of $H_2$ and only a very little of a solid silicon rich precipitate were formed in the autoclave.

The reaction according to the invention only proceeds slowly in the absence of a Friedel-Crafts catalyst. The acceleration of the reaction through such a catalyst is very marked if the quantity of catalyst is not too small. AlCl$_3$, as well as other halides of aluminum, or boron halides or other Friedel-Crafts catalysts can be employed. However, AlCl$_3$ is especially active for the reaction according to the invention and is not only easy to use but also the least expensive.

The starting material to be hydrogenated preferably is SiCl$_4$ as this is the cheapest and most easily accessible volatile silicon compound. As a second choice, SiHCl$_3$ comes into consideration. However, other silicon compounds, such as Si$_2$Cl$_6$, or other chlorine containing silanes, as well as chlorosilanes carrying organic substituents with or without Si—Si bonds, can also be hydrogenated at the SiCl bonds by the process according to the invention. When silanes are employed as starting materials, they must contain no more than one SiH bond on every silicon atom carrying a SiCl bond. The process according to the invention is especially suited for the production of chlorosilanes with 2 SiH bonds per silicon atom.

SiH$_4$, SiH$_3$Cl, SiH$_2$Cl$_2$ and Si$_2$H$_6$ can be employed as the hydrogenating components for the reaction according to the invention. For example, SiH$_3$Cl reacts according to the following equation:

$$SiCl_4 + 2SiH_3Cl \rightarrow 3SiH_2Cl_2$$

and therefore can be used either to replace SiH$_4$ partially or completely. SiH$_3$Cl, for example, is produced as a by-product in the conversion of SiCl$_4$ with SiH$_4$.

The following, for instance, is an example of the hydrogenation of an organic silicon compound according to the process of the invention:

$$(CH_3)_2SiCl_2 + SiH_3Cl \rightarrow (CH_3)_2SiHCl + SiH_2Cl_2$$

and $$2(CH_3)_2SiCl_2 + SiH_3Cl \rightarrow 2(CH_3)_2SiHCl + SiHCl_3$$

Products such as dimethyl hydrogen chlorosilane are produced in the Rochow synthesis (Si, Cu+CH$_3$Cl+H$_2$) and by the Grignard reaction from SiHCl$_3$ and CH$_3$MgBr. Both of such processes, however, are expensive, the first because the dimethyl hydrogen chlorosilane is produced in relatively small quantities and the second because large quantities of magnesium are required.

The following examples illustrate several modifications of the process according to the invention:

EXAMPLE 1

15 cc. of SiCl$_4$ and 8 liters of a SiH$_4$—CH$_4$ (1:1) mixture were introduced in a V2A steel autoclave of 50 cc. capacity. The CH$_4$ was admixed with the SiH$_4$ to reduce the spontaneous combustibility of the latter. (As no compressor was available, the SiH$_4$—CH$_4$ mixture was condensed with exclusion of air in a glass vessel with the aid of liquid nitrogen and the open glass vessel introduced into the autoclave which was closed as quickly as possible. A little water always condensed from the atmosphere on the cooled SiH$_4$—CH$_4$ containing vessel.)

The autoclave was heated for 20 hours at 300° C. The pressure attained at 300° C. was 150 atmospheres. Thereafter, the contents of the autoclave were permitted to cool and the gases after release from the autoclave were passed through a trap cooled with liquid nitrogen and the CH$_4$, SiH$_4$ and chlorosilanes contained therein condensed in the trap. Only the hydrogen produced by the decomposition of SiH$_4$ passed through. 1.5 liters of hydrogen were produced.

The temperature of the trap was adjusted to —80° C. to volatilize the SiH$_4$ and CH$_4$. The hydrogen content of the remaining condensate was measured. It contained 0.016% H. Si had been deposited on the wall of the autoclave.

EXAMPLE 2

The procedure of Example 1 was repeated, but with the addition of 2 grams of pure AlCl$_3$. The condensate in this case was volatile and was separated into five fractions at a pressure of 2–3 mm. Hg.

Fraction 1:
   Distilled at —80° C. _____grams__ 0.96
   Tension at —60° C. _____mm. Hg__ 150
Fraction 2:
   Distilled at —60° C. _____grams__ 3.33
   Tension at —60° C. _____mm. Hg__ 40
Fraction 3:
   Distilled at —50° C. _____grams__ 5.98
   Tension at 0° C. _____mm. Hg__ 400
Fraction 4:
   Distilled at —40° C. _____grams__ 4.97
   Tension at 15° C. _____mm. Hg__ 430
Residue _____grams__ 0.41
Tension at 15° C. _____mm. Hg__ 400

The compositions of the individual fractions were estimated from the known vapor pressures of chlorosilanes to be as follows:

Fraction 1:                     G.
   87% SiH$_3$Cl _____ 0.835
   13% SiH$_2$Cl$_2$ _____ 0.125
Fraction 2:
   18% SiH$_3$Cl _____ 0.59
   82% SiH$_2$Cl$_2$ _____ 2.71
Fraction 3:
   20% SiH$_2$Cl$_2$ _____ 1.20
   80% SiHCl$_3$ _____ 4.78
Fraction 4 residue: 100% SiHCl$_3$ _____ 5.38

About 5 grams of the condensate were lost. The condensate therefore contained:

8% SiH$_3$Cl
   26% SiH$_2$Cl$_2$
   66% SiHCl$_3$

A red powder remained in the autoclave which turned gray brown (Si) upon heating at a low red heat. This powder evolves H$_2$ with NaOH. 0.04 gram of such powder evolved 14 cc. of H$_2$ upon treatment with NaOH.

EXAMPLE 3

5 grams of pure AlCl$_3$, 50 cc. of SiCl$_4$ and 12 liters of SiH$_4$ (without CH$_4$) where placed in a shaking autoclave of 200 cc. capacity. The SiH$_4$ was condensed and introduced into the autoclave as in Example 1. The autoclave was heated with shaking to 300° C. for 4 hours. The pressure attained was 100 atmospheres. The gaseous content of the autoclave was passed through a trap cooled with liquid nitrogen. Only 1 liter of H$_2$ passed through such trap and some Si had separated in the autoclave. The trap containing the condensed chlorosilane was adjusted to a temperature of minus 150° C. and SiH$_4$ and HCl were drawn off. The residue was then fractionated into five fractions by distillation at 2–3 mm. Hg.

The fractions obtained were as follows:

| Fraction | Distillation Temperature, °C. | Tension in mm. Hg | Quantity, g. | Quantity of H$_2$ evolved per 100 mg. condensate upon treatment with NaOH |
|---|---|---|---|---|
| 1 | —80 | 160 at —60° C | 9.7 | 84 N cc. |
| 2 | —70 | 22 at —60° C | 10.2 | 39 N cc. |
| 3 | —50 | 16 at —60° C | 10.2 | 30 N cc. |
| 4 | —10 | 620 at +20° C | 17.1 | 14 N cc. |
| 5 | Residue | 360 at +20° C | 8.3 | |
| | | | [1] 55.5 | |

[1] About 5 g. loss.

Composition of the individual fractions

| Fraction | Estimated from the tensions | Estimated from the H₂ produced upon treatment with NaOH |
|---|---|---|
| 1 | 90% SiH₃Cl / 10% SiH₂Cl₂ | 70% SiH₃Cl / 30% SiH₂Cl₂ |
| 2 | 100% SiH₂Cl₂ | 80% SiH₂Cl₂ / 20% SiHCl₃ |
| 3 | 75% SiH₂Cl₂ / 25% SiHCl₃ | 50% SiH₂Cl₂ / 50% SiHCl₃ |
| 4 | 100% SiHCl₃ | 85% SiHCl₃ / 15% SiCl₄ |
| Residue | 30% SiHCl₃ / 70% SiCl₄ | 100% SiCl₄ |

The condensate therefore contained about

17% SiH₃Cl
30% SiH₂Cl₂
40% SiHCl₃
13% SiCl₄

EXAMPLE 4

SiH₄ and SiCl₄ in a 1:1 molar ratio were introduced into a 1 liter glass vessel containing 1 g. AlCl₃ and heated at atmospheric pressure for 4 hours at 300° C. About 1% of the quantity of SiCl₄ and traces of SiH₄ remained unaltered. About 8% of the SiH₄ had decomposed to SiH₂ (calculated upon the quantity of H₂ produced).

Upon heating for 24 hours a quantity of hydrogen was produced equivalent to 24% of the SiH₄ introduced. The reaction products were fractionated as in the aforegoing examples and the composition thereof calculated upon the quantity of H₂ produced upon treatment with NaOH was as follows:

6.4% SiH₃Cl
43.6% SiH₂Cl₂
48.0% SiHCl₃
2.0% SiCl₄

EXAMPLE 5

149 g. of methytrichlorosilane (obtained as primary by-product in the production of dimethyldichlorosilane from silicon and methylchloride) were heated with 67 g. monochlorosilane for 6 hours at 250° C. in the presence of boron fluoride. The liquid reaction product was fractionated by rectification. It was composed of about 30% monomethyldichlorosilane, 40% dichlorosilane, 10% monomethylmonochlorosilane and dimethyldichlorosilane and tetrachlorosilane, as well as some unaltered methyltrichlorosilane.

EXAMPLE 6

100 grams of 1-methyl-1,1-dichloro-2-ethyldisiloxane

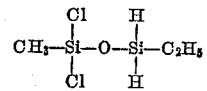

(I)

were mixed with 10 g. of water free AlCl₃ and heated for 24 hours at 200° C. 1-methyl-1,2-dichloro-2-ethyldisiloxane

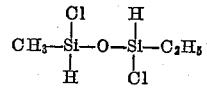

(II)

was produced.

The viscosities of the hydrolysis products of I:II were about 76:53.

I claim:

1. A process for the production of SiH₂Cl₂ which comprises heating a compound selected from the group consisting of silicon tetrachloride and silicon chloroform in the presence of monosilane at a temperature between 100° C. and 400° C.

2. A process for the production of SiH₂Cl₂ which comprises heating silicon tetrachloride in the presence of monosilane at a temperature between 100° C. and 400° C.

3. The process of claim 2 in which said process is carried out in the presence of a Friedel-Crafts catalyst.

4. The process of claim 2 in which said process is carried out in an autoclave under superatmospheric pressures.

5. The process of claim 2 in which said process is carried out in the presence of AlCl₃.

6. A process for the production of SiH₂Cl₂ which comprises heating silicon chloroform in the presence of monosilane at a temperature between 100° C. and 400° C.

7. The process of claim 6 in which said process is carried out in the presence of a Friedel-Crafts catalyst.

8. The process of claim 6 in which said process is carried out in an autoclave under superatmospheric pressures.

9. The process of claim 6 in which said process is carried out in the presence of AlCl₃.

References Cited in the file of this patent
UNITED STATES PATENTS

| | | |
|---|---|---|
| 2,458,703 | Hatcher | Jan. 11, 1949 |
| 2,595,620 | Wagner | May 6, 1952 |
| 2,627,451 | Erickson et al. | Feb. 3, 1953 |
| 2,732,281 | Bailey et al. | Jan. 24, 1956 |

OTHER REFERENCES

"Chemistry of the Silicones," by Rochow, 2nd ed., John Wiley and Sons, New York (1951), pages 6 and 7.

"Chemistry of the Hydrides," by Hurd, John Wiley and Sons, New York (1952), pages 109–110.